Figure 3:
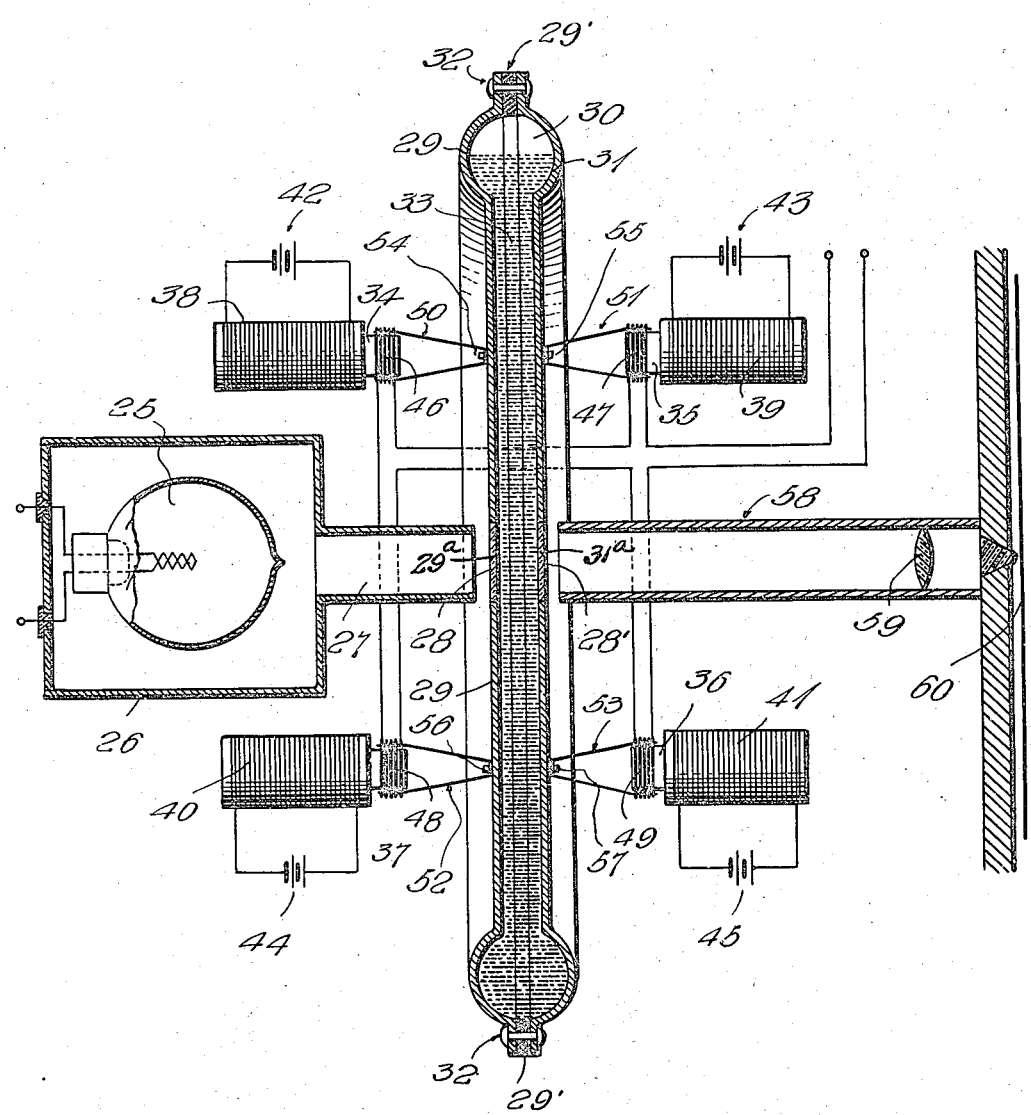

Jan. 24, 1933.　　　B. J. CHROMY　　　1,894,942
LIGHT MODULATING DEVICE
Filed Feb. 28, 1929　　2 Sheets-Sheet 1
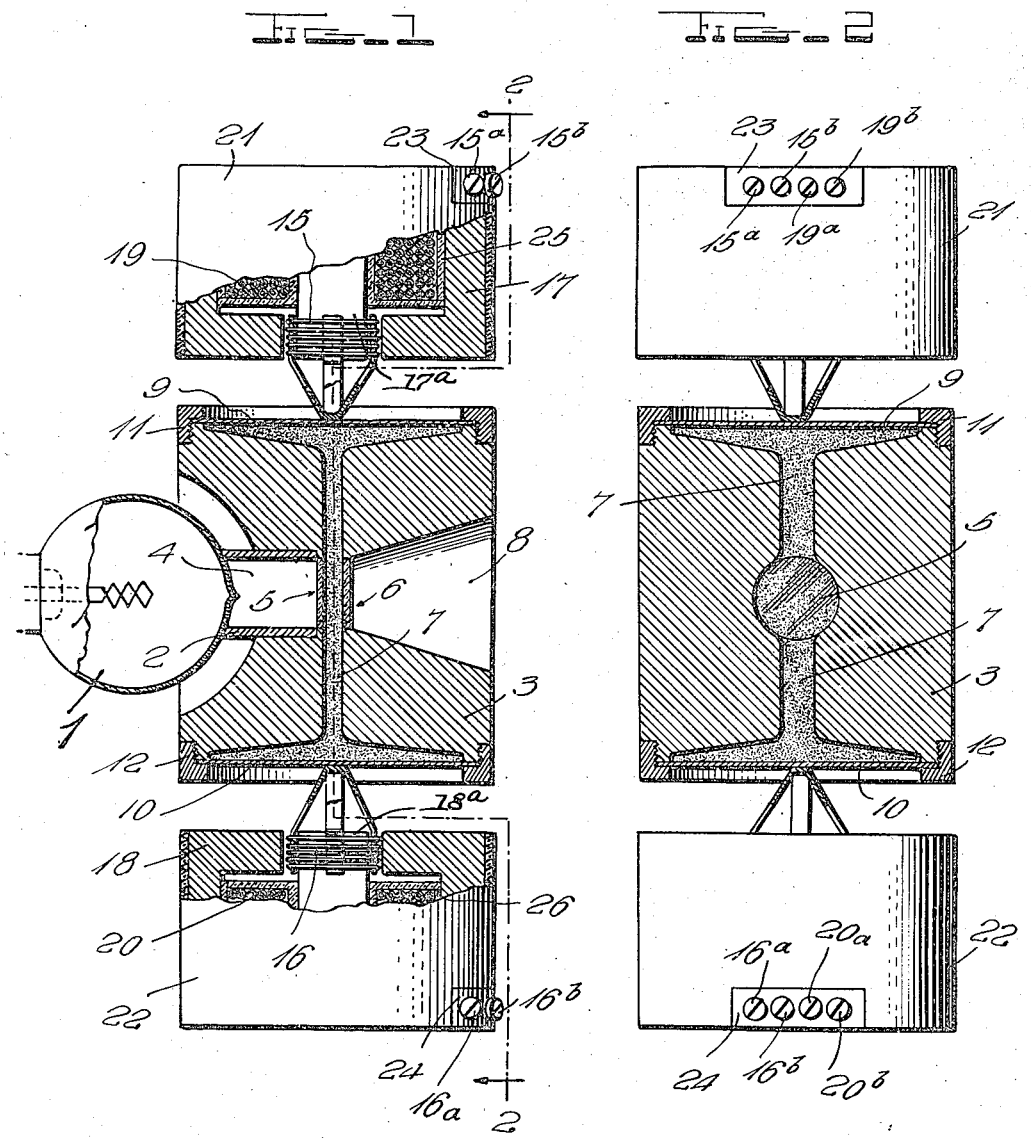

Jan. 24, 1933.  B. J. CHROMY  1,894,942
LIGHT MODULATING DEVICE
Filed Feb. 28, 1929  2 Sheets-Sheet 2

INVENTOR.
Ben J. Chromy,
BY John C. Orely
ATTORNEY

Patented Jan. 24, 1933

1,894,942

UNITED STATES PATENT OFFICE

BEN J. CHROMY, OF HOPKINS, MINNESOTA, ASSIGNOR TO WIRED RADIO, INC., OF NEW YORK, N. Y., A CORPORATION OF DELAWARE

LIGHT MODULATING DEVICE

Application filed February 28, 1929. Serial No. 343,541.

This invention relates to light modulating systems in general. More specifically this invention relates to systems wherein light is modulated according to some pattern to be reproduced or recorded.

An object of this invention is to provide a system wherein light rays from a constant source of light may be modulated.

Another object of this invention is to provide a system wherein light rays from a constant source of light may be modulated according to signalling energy.

Still another object of this invention is to provide a system in which light rays are modulated by an electromagnetically actuated arrangement.

A further object of this invention is to provide a system in which light rays pass through a light absorbing medium, the dimensions of which are varied in a direction parallel or approximately parallel to the direction of the light rays in accordance with signalling energy.

A still further object of this invention is to provide a system in which light rays pass through a light absorbing medium, the density of which is varied in accordance with signalling energy.

Another object of this invention is to provide a system in which rays of a corpuscular nature are modulated in accordance with signalling energy by passing rays of a corpuscular nature of substantially constant intensity through an absorbing medium a dimension of which is varied in accordance with the signalling energy.

According to this invention the rays of a corpuscular nature of constant intensity are modulated in accordance with mechanical vibrations impressed upon an electric circuit by methods well known to those skilled in the telephone art, or in accordance with any modulated electric current, by causing modulated electrical energy to vary the density or other dimensions of a corpuscular ray absorbing medium, upon the surface of which corpuscular rays are caused to impinge and through which they are caused to penetrate in varying quantities.

Referring to the drawings briefly, Fig. 1 illustrates in fragmentary cross-section a view in vertical side elevation of an embodiment of this invention; Fig. 2 illustrates a view in partial section of an embodiment of this invention taken along the line 2—2 of Fig. 1 and Fig. 3 illustrates a modified form of this invention.

In Fig. 1 of the drawings reference numeral 1 designates a source of light rays of constant intensity. Either an arc lamp of the carbon electrode or mercury vapor type or any other convenient light source may be employed. A tube 2, preferably of metallic material, supported by the casing 3 abuts against the light source 1 and provides an unobstructed path for the light rays from the source 1 through the chamber 4 of the casing 3. The tube 2 may be made of considerable length in order to remove the light source from close proximity to the casing 3 and thereby prevent excessive heating of the casing. A housing (not shown) is provided about the light source to prevent undesirable light rays from being transmitted in all directions from the light source. Light rays from the source pass successively through the tube 2, the transparent members 5 and 6, which are of quartz, glass or similar material, and through the medium 7 which is partially confined between the members 5 and 6, out into the open chamber 8 in which suitable concentrating members or focusing lens systems well known in the art may be provided.

The medium 7 consists of any gas having light absorbing properties, such as nitrogen dioxide, nitrous oxide, nitric oxide, chlorin gas, bromine vapors or carbon dioxide. Diaphragms 9 and 10 are provided to the extremities of the chamber within which the light absorbing medium 7 is confined. Threaded ring members 11 and 12 are provided for retaining the diaphragms 9 and 10, respectively. Coils 15 and 16 are positioned directly in the airgaps of the magnetic circuits 17 and 18 in which a magnetic field is set up by virtue of a current flowing in the windings 19 and 20. A source of supply (not shown) which may be of any of the conventional direct current types, such as a battery, motor generator or a rectified and filtered alternating current supply is connected to the windings 19 and 20.

The windings 19 and 20 are confined, respectively in compartments 25 and 26, which have walls of insulating material such as phenol condensation products. The poles 17a and 18a which are formed of magnetic material and comprise portions of the magnetic circuit 17 and 18 are encircled by the windings 19 and 20. Housings 21 and 22 are provided to enclose the compartments 25 and 26, respectively and the magnetic circuits 17 and 18, respectively.

The coils 15 and 16 may be connected either in series or in parallel in the proper relation to the output circuit of any conventional type of television receiving set which is adapted to operate a glow discharge device or similar picture reproducing device. The circuit connection for corresponding windings is illustrated in Fig. 3. The diaphragms 9 and 10 are vibrated in accordance with the modulated electrical energy impressed upon the circuit of the coils 15 and 16. Diaphragm 9 cooperates with diaphragm 10 to compress or expand the medium 7 in accordance with the modulated energy fed to the coils 15 and 16. The chamber within which the light absorbing medium 7 is confined is preferably so shaped that the major portion of its volume is between the transparent members 5 and 6 directly in the path of the light rays. A scanning disc of any conventional type (not shown) may be provided adjacent to the mouth of the chamber 8 of the casing 3 for scanning a screen with the beam of modulated light rays emerging from the mouth of the chamber 8.

The arrangement herein described may be used in the recording of sound upon a film also, in which case the conventional sound recording apparatus adapted for recording sound modulated light rays upon a sensitive film strip is positioned adjacent to the mouth of the chamber 8 and the coils 15 and 16 are connected either in series or in parallel in the proper relation to a microphone circuit or the output circuit of an amplifying circuit upon which is impressed sound modulated electrical energy.

In Fig. 2 is illustrated a sectional view in front elevation in which the formation of the light absorbing medium confined in chamber 8 is illustrated more clearly. Panels 23 and 24 of insulating material are positioned adjacent the housings 21 and 22, respectively, for supporting the binding posts 15a, 15b, 19a, 19b and 16a, 16b, 20a, 20b, respectively. Connections are provided between the binding posts 15a, 15b and the terminals of the moving coil 15 and between the binding posts 16a, 16b and the terminals of the moving coil 16. Connections are also provided between the windings 19 and 20 and the binding posts 19a, 19b and 20a, 20b respectively.

A modification of this invention which employs a liquid as a light absorbing medium is illustrated in Fig. 3 of the drawings. Reference is herein had to my copending application Serial Number 306,541 filed Sept. 17, 1928 now Patent 1,763,220, dated June 10, 1930 for sound recording apparatus in which a liquid light absorbing medium is employed in one of the modified embodiments of the invention therein disclosed. Fig. 3 of the drawings is an embodiment of this invention operating on the same fundamental principle as the embodiment referred to in the above copending application.

In Fig. 3 reference numeral 25 designates a source of light rays. Housing 26 is provided about the light source to prevent light rays from the source from radiating in all directions. A tube 27 is provided to the housing 26. Light rays from the source are transmitted through the tube 27 to the transparent member 28 which is provided in the wall 29 of the device 30. Another wall 31 similar to the wall 29 is fastened to the wall 29 by screw or rivet member 32. A transparent member 28' is provided to the wall 31 in alignment with the transparent member 28. A gasket 29' of rubber, asbestos or similar material is provided between the walls 29 and 31 at their periphery where they are held adjacent to each other by the members 32. A liquid light absorbing medium consisting of such materials as oils, solutions of aniline dyes, potassium permanganate, water glass or similar solutions or materials having marked light absorbing qualities, is confined within the device 30. Light rays transmitted from the source through the tube 26 and the transparent members 28 and 28' are partially absorbed by the medium 33 and the dimmed rays pass out through the member 28. Electromagnetic devices 34, 35, 36 and 37 are provided with windings 38, 39, 40, and 41 respectively. Connections are provided between the windings 38, 39, 40 and 41 and the sources of current supply 42, 43, 44 and 45, respectively. Movable windings 46, 47, 48 and 49 are associated with the electromagnetic devices 34, 35, 36 and 37, respectively. Permanent magnets may be employed in place of the electromagnetic devices 34, 35, 36 and 37 which are magnetized by the action of the current flowing through the windings 38, 39, 40 and 41, respectively. Mechanical connections 50, 51, 52 and 53 support the windings 46, 47, 48 and 49, respectively against the diaphragm portions of the walls 29 and 31 through the cooperation of the rivets or similar members 54, 55, 56 and 57, respectively. Connections between the windings 46, 47, 48 and 49 and a source of sound modulated energy, such as the output circuit of an amplifying system or a source of light modulated energy, such as the output circuit of a television receiving set, are provided.

The light rays transmitted by the light source 25 to the light absorbing medium 33 are emitted from the transparent member 28' as modulated light rays, modulated in accordance with the signalling energy impressed upon the circuit of the windings 46, 47, 48 and 49. Through the electromagnetic action taking place between the magnetic field set up by current flowing through windings 38, 39, 40 and 41 and the pulsating magnetic field set up by the current flowing through the windings 46, 47, 48 and 49 respectively the diaphragm portions 29a and 31a of the walls 29 and 31 are vibrated in accordance with modulated energy impressed upon the circuits of coils 46, 47, 48 and 49 and the light ray absorbing medium 33 between the transparent members 28 and 28' is increased or decreased in its dimension parallel to the light rays. The magnitude of the light energy absorbed by the medium 33 is governed by the character of the modulations impressed upon the modulated energy impressed upon the movable coils connected to the diaphragm portions of the walls 29 and 31.

In the modification of this invention illustrated in Fig. 3 the source of radiant energy 25 may consist of a source of X-rays or Roentgen rays in which case the walls 29 and 31 are preferably made entirely of aluminum or similar material and the housing 26 and tube 27 are made of thick sheet lead. The X-ray absorbing medium 33 preferably employed is sodium silicate solution although other solutions or oils having marked X-ray absorbing properties may be employed. The modulated X-rays are rendered visible by directing them upon a screen coated with zinc sulphide, barium platino cyanide or similar materials rendered fluorescent under the action of X-rays.

A tubular member 58 is provided adjacent to the wall 31. A lens 59 for concentrating the modulated light rays upon the recording film 60 is provided to the tubular member 58. If it is desired to reproduce motion pictures received through television receiving set a scanning disc is employed in place of the film 60 and the light rays are caused to scan a screen.

In the claims wherever I have defined the light absorbing medium as having a fluid consistency, I intend to include both a gaseous and a liquid light absorbing medium and have selected the term "fluid consistency" to be embracive of all types of liquid or gaseous light absorbents.

While I have described my invention in certain preferred embodiments I desire it understood that modifications thereof may be made without departing from the spirit of this invention and therefore I desire it understood that the foregoing specification is merely explanatory and that this invention is to be limited in scope only by the appended claims.

What I claim and desire to secure by Letters Patent of the United States is as follows:—

1. In apparatus of the class described the combination of, a source of light, a diaphragm, a light absorbing medium of fluid consistency, means for directing light rays through said absorbing medium, and magnetically actuated means operated in accordance with signalling energy for actuating said diaphragm and changing the dimensions of the path through said absorbing medium for causing said absorbing medium to absorb said light rays in variable quantities whereby said light rays are modulated in accordance with said signalling energy.

2. In apparatus of the class described the combination of, a source of light, a diaphragm, a light absorbing medium of fluid consistency confined on one side of said diaphragm, electromagnetic means for actuating said diaphragm and variably displacing said medium, said electro magnetic means having signalling energy impressed upon the circuits thereof whereby the said light is modulated in accordance with said signalling energy.

3. In devices of the class described the combination of, a source of light, a light absorbing medium of fluid consistency, means for directing light rays through said absorbing medium, a plurality of diaphragms confining said light absorbing medium, electromagnetic means connected to said diaphragms for vibrating said diaphragms in accordance with signalling energy for variably changing the dimensions of said medium in the direction of the light rays whereby the magnitude of the light absorbed by said absorbing medium is varied in accordance with said signalling energy.

4. In devices of the class described the combination of, a source of light, a light absorbing medium of fluid consistency, means for directing light rays through said absorbing medium, a plurality of diaphragms confining said light absorbing medium, coils mounted upon said diaphragms, means for producing a magnetic field about said coils, and connections for impressing signalling energy upon the circuits of said coils for vibrating said diaphragms for changing the dimensions of said medium in the direction of the light rays and cause the light rays penetrating said absorbing medium to be modulated in accordance with said signalling energy.

In testimony whereof I affix my signature.

BEN J. CHROMY.